US 11,445,670 B2

(12) United States Patent
Daining et al.

(10) Patent No.: US 11,445,670 B2
(45) Date of Patent: Sep. 20, 2022

(54) STUMP CUTTER

(71) Applicant: Fecon, LLC, Lebanon, OH (US)

(72) Inventors: Stephen Daining, Pella, IA (US);
Matthew David Greenawalt, Pella, IA (US); George Danny Toubekis, University Park, IA (US)

(73) Assignee: Fecon, LLC, Lebanon, OH (US)

( * ) Notice: Subject to any disclaimer, the term of this patent is extended or adjusted under 35 U.S.C. 154(b) by 0 days.

(21) Appl. No.: 16/357,951

(22) Filed: Mar. 19, 2019

(65) Prior Publication Data

US 2020/0146225 A1    May 14, 2020

Related U.S. Application Data

(60) Provisional application No. 62/760,001, filed on Nov. 12, 2018.

(51) Int. Cl.
*A01G 23/06* (2006.01)

(52) U.S. Cl.
CPC ................... *A01G 23/067* (2013.01)

(58) Field of Classification Search
CPC .............................. A01G 23/06; A01G 23/067
See application file for complete search history.

(56) References Cited

U.S. PATENT DOCUMENTS

| | | |
|---|---|---|
| 3,104,509 A | 9/1963 | Clendenin et al. |
| 3,308,860 A * | 3/1967 | De Shano ............ A01G 23/067 144/24.12 |
| 3,522,693 A | 8/1970 | Knapp |
| 3,828,794 A | 8/1974 | Gochanour et al. |
| 4,250,896 A | 2/1981 | Wagstaff et al. |
| 4,344,442 A | 8/1982 | Torland et al. |
| 5,145,462 A | 9/1992 | Tanis et al. |
| 5,239,811 A | 8/1993 | Spearman |

(Continued)

FOREIGN PATENT DOCUMENTS

| | | |
|---|---|---|
| CN | 201609017 | 10/2010 |
| DE | 4138857 A1 | 7/1992 |

OTHER PUBLICATIONS

Bandit, "Bandit 430 Stump Grinder," image (Admitted Prior Art—Publicly available at least as early as Nov. 11, 2018) 2 pages, which includes a Statement of Relevance.

(Continued)

*Primary Examiner* — Matthew Katcoff
(74) *Attorney, Agent, or Firm* — Ulmer & Berne LLP

(57) ABSTRACT

A material reduction machine includes a frame, an arm assembly coupled to the frame, and a bearing assembly coupled to the arm assembly adjacent a distal end. A shaft is rotatably coupled to the bearing assembly and has an axis. A comminution wheel is coupled to the shaft for rotation therewith. The comminution wheel is configured to be driven by a drive system and extends outward from the shaft in a radial direction that is perpendicular to the axis. A gap is defined between a portion of the shaft, the bearing assembly, and the comminution wheel, and a guard plate is attached to the bearing assembly or the arm assembly. The guard plate has an axial extent extending along the axis and a radial extent extending radially relative to the axis to at least partially fill the gap. The axial extent and the radial extent lie in a plane.

24 Claims, 12 Drawing Sheets

(56) References Cited

U.S. PATENT DOCUMENTS

| | | | |
|---|---|---|---|
| 5,245,817 A | 9/1993 | Hohnl | |
| 5,355,918 A | 10/1994 | Lang | |
| 5,365,724 A | 11/1994 | Wagner | |
| 5,794,673 A * | 8/1998 | Milbourn | A01G 23/067 |
| | | | 144/218 |
| 6,640,851 B1 | 11/2003 | Bennington | |
| 9,462,759 B2 * | 10/2016 | Knipp | A01G 23/06 |
| 10,278,340 B2 * | 5/2019 | Holman | A01G 23/067 |
| 10,517,235 B2 * | 12/2019 | Casper | A01G 23/067 |
| 2007/0051427 A1 * | 3/2007 | Wise | A01G 23/067 |
| | | | 144/24.12 |
| 2016/0330902 A1 | 11/2016 | Morabit | |

OTHER PUBLICATIONS

Bandit, "Bandit 446 Stump Grinder," image (Admitted Prior Art—Publicly available at least as early as Nov. 11, 2018) 2 pages, which includes a Statement of Relevance.

Vermeer, "SC 70TX Stump Grinder," image (Admitted Prior Art—Publicly available at least as early as Nov. 11, 2018) 3 pages, which includes a Statement of Relevance.

Timken, "Spherical Roller Bearing Solid-Block Housed Units, Seal and Cover Options—Secondary Seals," brochure (Admitted Prior Art—Publicly available at least as early as Nov. 11, 2018) 4 pages.

\* cited by examiner

US 11,445,670 B2

STUMP CUTTER

RELATED APPLICATIONS

This application claims the benefit of U.S. Provisional Patent Application No. 62/760,001 filed Nov. 12, 2018, the entire content of which is hereby incorporated by reference herein.

BACKGROUND

The present invention relates to material reduction machines with a rotatable shaft, and more specifically to material reduction machines that minimize material from wrapping around portions of the rotatable shaft during use.

Material reduction machines are typically used in environments where material (e.g., wire, vegetation, twine, hose, etc.) lays on the ground or is buried in the ground. When existing material reduction machines are used in these environments, the material often wraps around the shaft or other rotating parts of the machine (e.g., the shaft of a comminution wheel of a stump cutter). The wrapped material becomes tightly wound around the rotating part(s) and can damage the bearing assembly, the shaft, or other parts of the machine, and can prevent the machine from being used until the material is removed. A user is often forced to spend a significant amount of time removing the tightly wrapped material so that the machine can continue to be used.

SUMMARY

In one aspect, the invention provides a guard plate that can be attached to the material reduction machine (e.g., to a cutter assembly of a stump cutter) to minimize downtime of the machine due to material becoming entangled in the assembly. For example, the guard plate has an axial extent and a radial extent that fill, or predominantly fill, a gap that exists adjacent the comminution wheel and the shaft that rotates the comminution wheel. Optionally, the guard plate can have different shapes and sizes of the axial and radial extents to accommodate different material reduction machines, or to account for gaps that have different sizes or shapes. Another option is to provide the guard plate with a yield feature that facilitates bending or breaking the guard plate when an overload situation occurs (e.g., where a significant amount of material becomes entangled in the machine). Still other options for the guard plate, including the quantity of guard plates used and the features associated with the guard plate, are described in detail below.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

The material reduction machine described herein should be interpreted to include any machine that has a rotatable shaft and a mechanism for reducing or removing material (e.g., a stump, earth, etc.). While the invention is described in detail relative to a material reduction machine that is represented as a stump cutter (also referred to as a stump grinder or stump chipper), it should be understood that the invention contemplates other material reduction machines including, but not limited to, trench diggers, rotary reduction machines, cultivators, and aerators.

Figure 1:
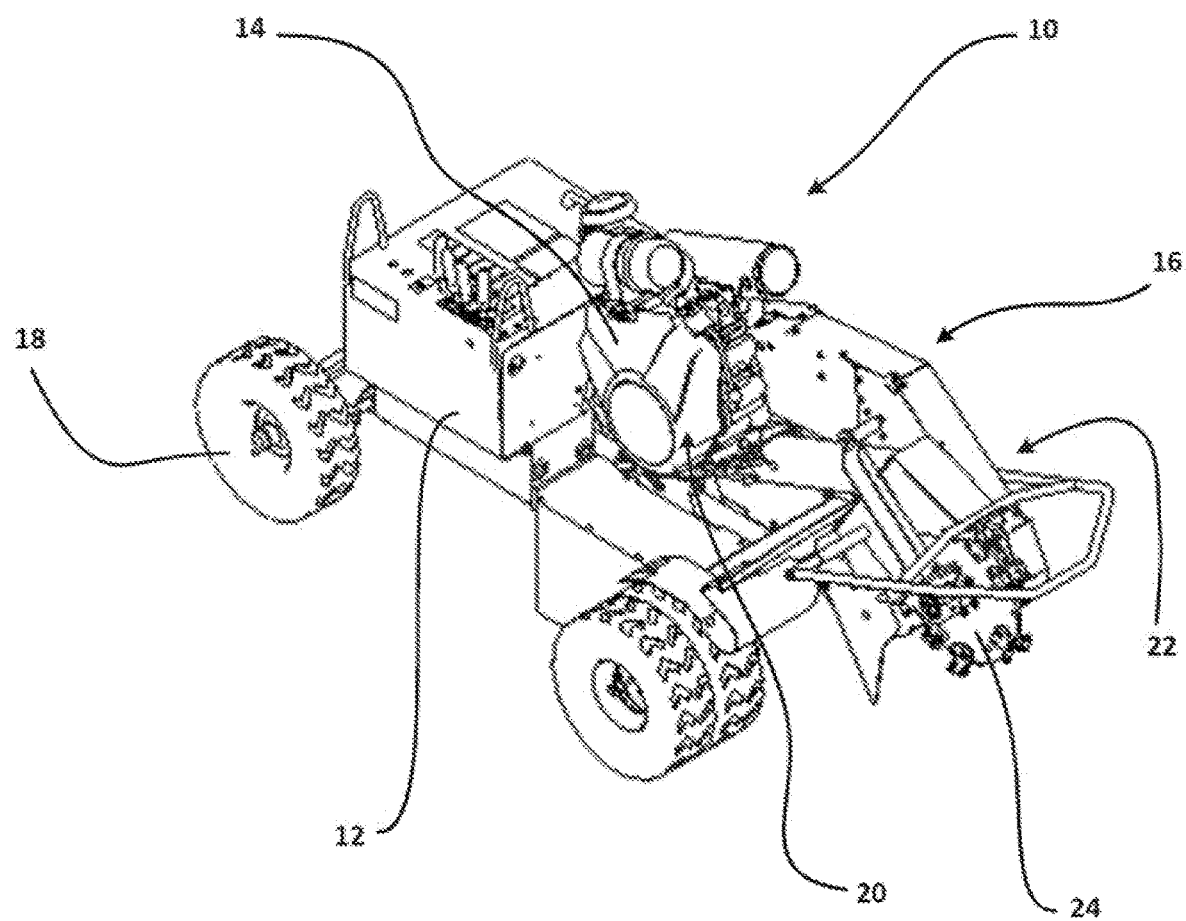
FIG. 1 is a perspective view of an exemplary material reduction machine represented as a stump cutter.

FIG. 1 illustrates an exemplary material reduction machine or stump cutter 10 including a chassis or main frame 12, a primary driver 14 (e.g., an internal combustion engine, an electric motor, etc.) that is supported by the main frame 12, and an arm assembly 16 that is coupled to and that extends from the main frame 12. The material reduction machine 10 may include one or more wheels 18 (or tracks), such that the material reduction machine 10 can move across the ground or other surfaces. The material reduction machine 10 can be self-propelled (i.e. as a walk-behind machine) or operated in a different manner. The arm assembly 16 is cantilevered relative to the main frame 12 and includes a proximal end 20 that is attached to the main frame 12, and a distal end 22 that is opposite the proximal end 20 and that supports a comminution wheel 24. The arm assembly 16 attaches to the main frame 12 in such a way that the arm assembly 16 can move or swing in different directions (e.g., up-down, left-right) relative to the main frame 12 to permit the comminution wheel 24 to be placed in a desired position during removal of material.

Figure 2:
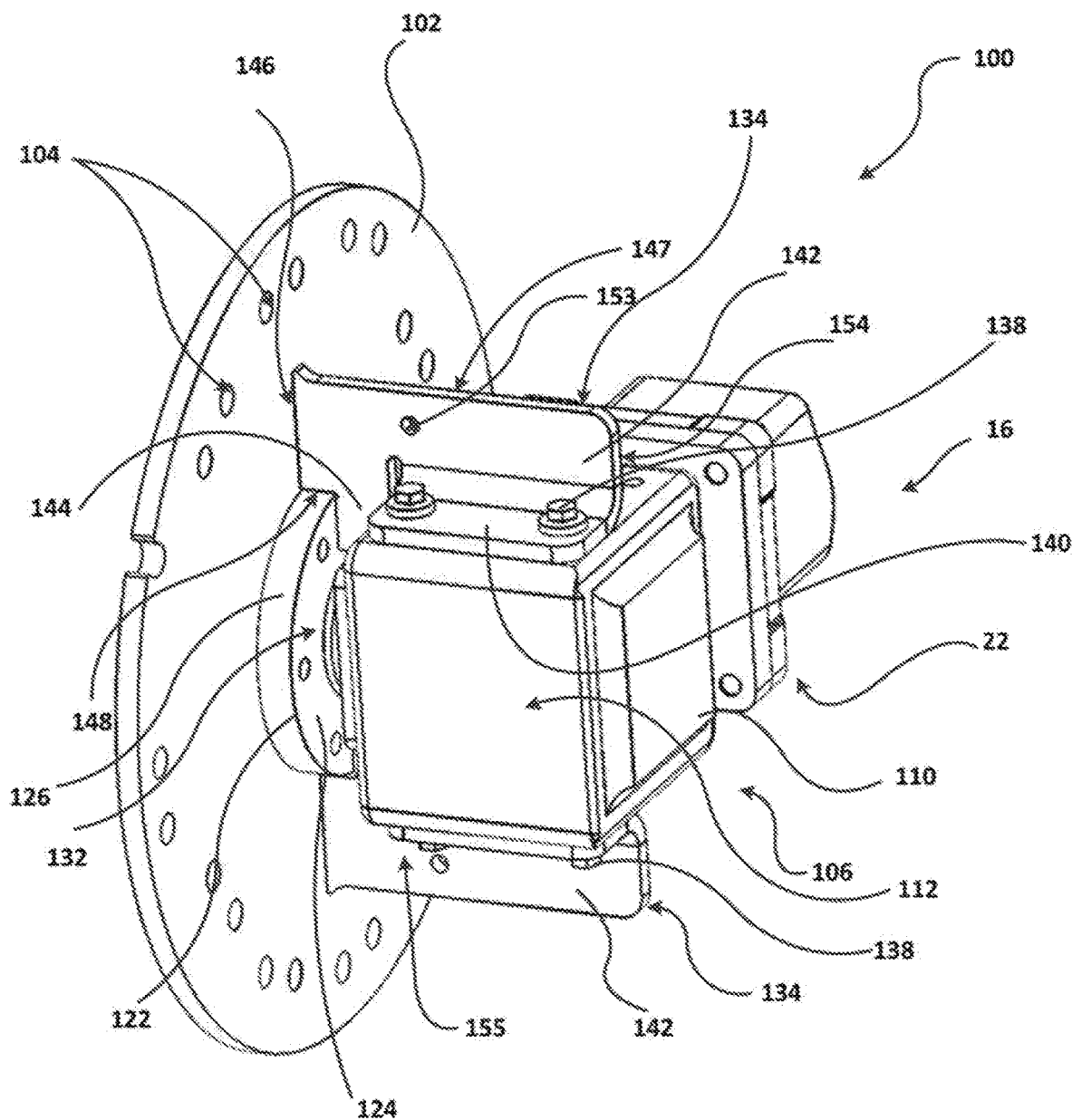
FIG. 2 is a perspective view of a portion of a cutter assembly embodying the present invention.
Figure 3:
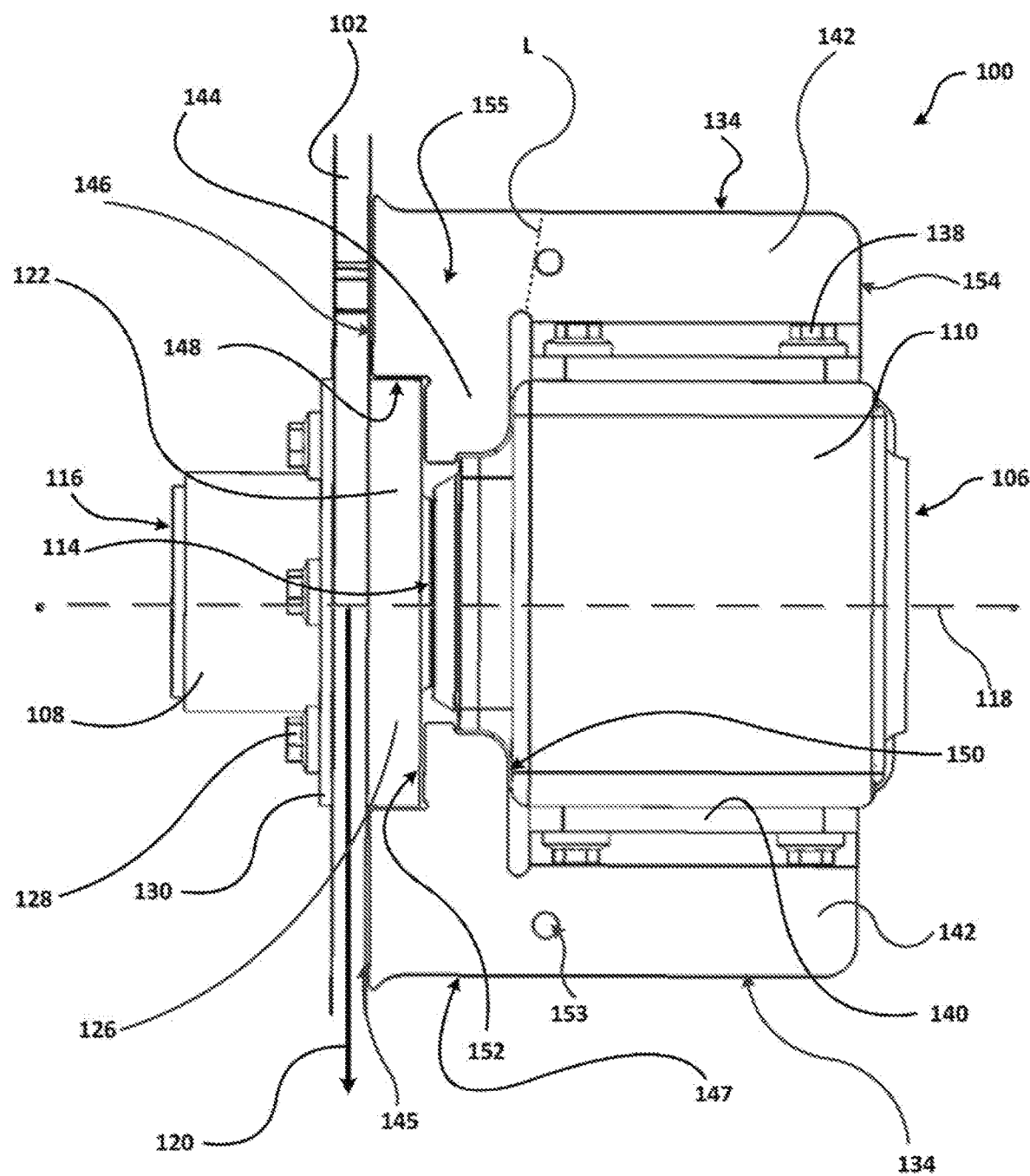
FIG. 3 is an elevation view of the cutter assembly of FIG. 2.
Figure 4:
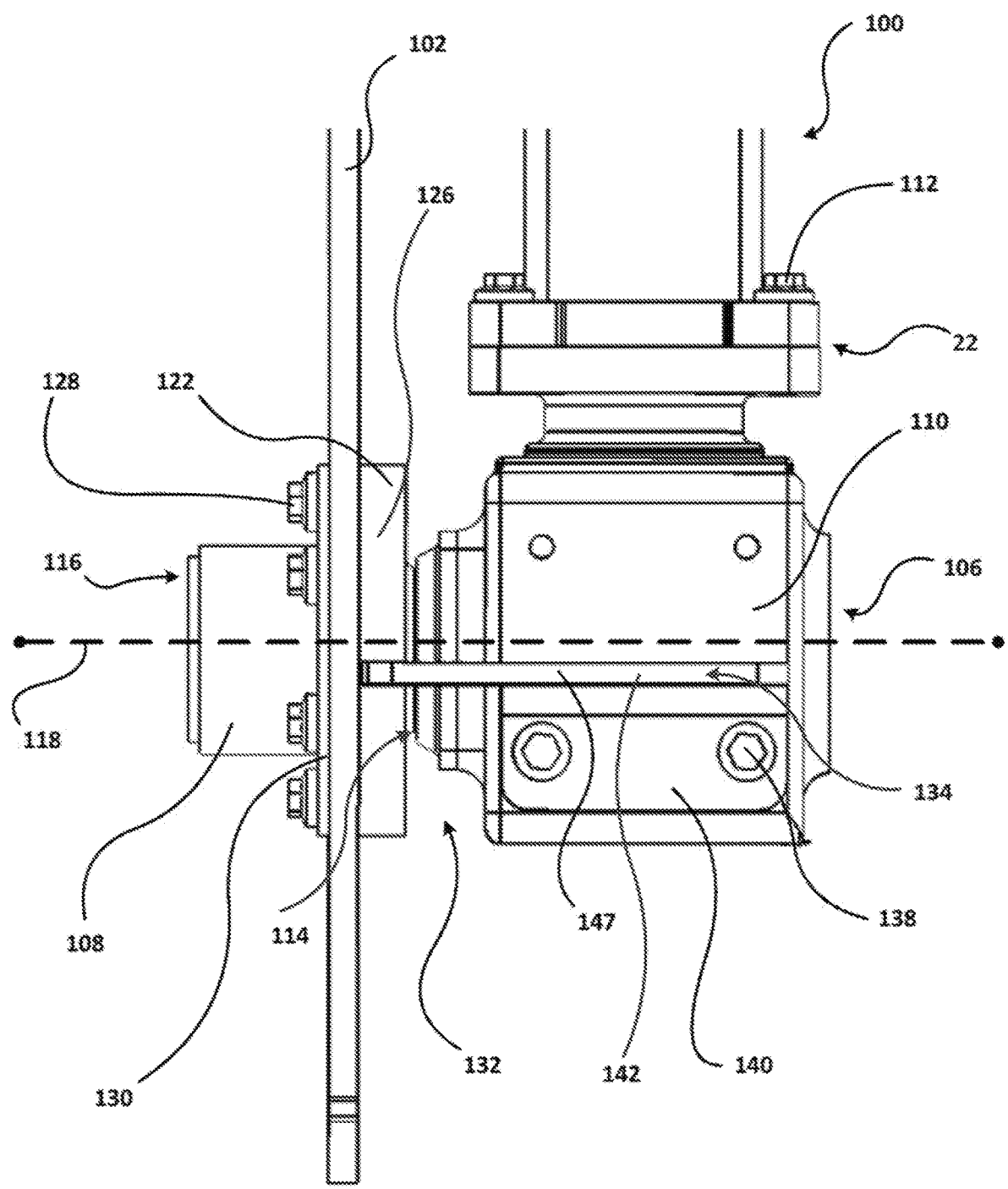
FIG. 4 is a top view of the cutter assembly of FIG. 2.

FIGS. 2-4 illustrate a portion of an exemplary stump cutter assembly 100 that can be mounted on the distal end of the arm assembly 16 for incorporation into the material reduction machine 10, or used on another machine (not illustrated). The stump cutter assembly 100 includes a comminution wheel 102 that is rotatably coupled to the distal end 22 of the arm assembly 16 via a gearbox assembly (or bearing assembly) 106 and a shaft 114. The comminution wheel 102 can be driven by the primary driver 14 or another drive system (not shown). Example drive systems can include a drive shaft connected to a tractor, a power takeoff connection with either a tractor or skid steer vehicle, and the like. As illustrated in FIG. 2, the comminution wheel 102 includes a plurality of attachment points 104 to which cutters or teeth (e.g., teeth 207 illustrated in FIG. 5) can be mounted on the comminution wheel 102.

With continued reference to FIGS. 2-4, the gearbox assembly 106 includes a gearbox 110 that is coupled to the arm assembly 100 adjacent the distal end 22 by one or more fasteners 112 (best seen in FIG. 4). While the stump cutter assembly 100 is described below in detail with reference to the gearbox assembly 106 and the gearbox 110, it should be appreciated that element 106 can alternatively be referred to as a bearing assembly and that element 110 can be referred to as a bearing housing. Although not illustrated, the gearbox assembly 106 also includes a bearing support, bearings coupled to the bearing support, and a shaft support that is coupled to the bearings to rotatably support the shaft 114 as would be understood by one of ordinary skill in the art. This shaft support (not shown) can include an inner race of a bearing disposed within the bearing housing gearbox 110 of the gearbox assembly 106. The bearing support can include an outer race of a bearing disposed within the gearbox 110 of the gearbox assembly 106. The shaft 114 has an end housing or cap 108 that houses the distal or free end 116 of the shaft 114 that is cantilevered relative to the gearbox assembly 106. The shaft 114 is rotatable about a shaft axis 118. The shaft 114 is coupled to the comminution wheel 102 via the end cap 108 and a hub 122 such that rotation of an input shaft (not shown) in the arm assembly 100 transfers to the shaft 114 through the gearbox assembly 106 to rotate the comminution wheel 102. The shaft 114 can be arranged 90 degrees relative to the rotational axis of the input shaft. The shaft axis 118 defines an axial direction (i.e. along or parallel the shaft axis 118), and the comminution wheel 102 extends in a radial direction 120 relative to the shaft axis 118.

The hub 122 is connected to and rotates with the shaft 114 and abuts or contacts a surface of the comminution wheel 102. The hub 122 includes an exterior surface 124 (facing away from the comminution wheel 102) and a circumferential surface 126. As illustrated, fasteners 128 couple the comminution wheel 102 to the hub 122. It should be appreciated that the hub 122 can be integrally formed with the shaft 114. With reference to FIGS. 3 and 4, a plate 130 is placed on the opposite side of the comminution wheel 102 relative to the side on which the hub 122 is located to facilitate attachment of the hub 122 to the comminution wheel 102. Referring to FIGS. 2 and 4, a radial pocket or gap 132 is defined between the gearbox 110, a portion of the shaft 114, and the exterior face 124.

With reference to FIGS. 2-4, the stump cutter assembly includes guard plates 134 that are attached to the bearing housing 110 via fasteners 138. In some embodiments, the guard plate 134 can be directly attached to the arm assembly 16. In view of the description below, it should be appreciated that the stump cutter assembly 100 can include one or more than one guard plate 134. Each guard plate 134 includes a mounting portion 140, a first guard portion 142, and a second guard portion 144. The mounting portion 140 includes mounting holes (not shown) through which the fasteners 138 extend to secure the guard plate on the bearing housing 110. Each guard plate 134 remains fixed relative to the bearing housing 110 (or other structure of the cutter wheel assembly) and does not rotate with the comminution wheel 102.

As illustrated in FIGS. 2 and 3, the first guard portion 142 extends from the mounting portion 140 at an angle (e.g., 90 degrees) in a direction that is generally perpendicular to the shaft axis 118 (e.g., outward from the bearing housing 110 along the radial direction 120) and fills space above (as viewed in FIG. 3) the bearing housing 110. The first guard portion 142 also extends along or generally parallel to the shaft axis 118 toward the comminution wheel 102. The first guard portion 142 is positioned adjacent the comminution wheel 102 such that a small clearance gap 145 exists between the comminution wheel 102 and a first axial edge 146 of the guard plate 134 (closest to the comminution wheel 102). As shown in FIG. 3, a radial outer edge 147 of the first guard portion 142 rises radially outward (e.g., as a straight inclined edge, a convex curved edge, a concave curved edge, etc.) adjacent the comminution wheel 102. In some embodiments, the rise may extend along a larger portion of the outer edge 147 (e.g., less than half of the axial length of the guard plate 134 or more than half of the axial length of the guard plate 134), or along the entire length of the guard plate 134. The rise aids in preventing material from wrapping tightly around the assembly 100, and can aid in preventing material from contacting the comminution wheel 102 (i.e. direct it away from the wheel 102) if material does wrap around the assembly 100. A portion of a first radial inner edge 148 of the first guard portion 142 is disposed adjacent the circumferential surface 126 of the hub 122.

The second guard portion 144 extends radially inward from the first guard portion 142. The second guard portion 144 has a second radial inner edge 150 that terminates adjacent the shaft 114 and the bearing housing 106. The second guard portion 144 has a second axial edge 152 that terminates adjacent the hub 122. The first guard portion 140 defines an axial extent of the guard plate 134, and the second guard portion 144 defines a radial extent of the guard plate 134. The first and second guard portions 142, 144 cooperate to protect the gap 132 from accumulating material that has a tendency to wrap around the assembly 100 or material that would otherwise get stuck in the assembly 100 within the gap 132. Stated another way, the guard plate 134 occupies, or at least substantially (mostly or nearly entirely) occupies the gap 132 along a plane extending through the guard plate 134.

With continued reference to FIGS. 2 and 3, the guard plate 134 also includes an aperture 153 (e.g., cylindrical, ovular, rectangular, or otherwise elongated) that is positioned generally closer to the first axial edge 146 than a third axial edge 154 of the guard plate 134. The aperture 153 facilitates yielding of a portion of the guard plate 134 when a significant amount of material wraps around the guard plate 134 or otherwise impacts the guard plate 134. This yielding can be simply bending the guard plate 134, or fracturing the guard plate 134 (e.g., having at least a portion of the guard plate break off). With reference to FIG. 3, the portion that generally yields (i.e. yield section 155) is generally defined by the area between a dotted line L passing radially through the aperture 153 and the first axial edge 146. Stated another way, the first and second guard portions 142, 144 cooperatively define the yield section 155, and the yield section 155 generally corresponds to the portion of the guard plate 134 that occupies the gap 132. The aperture 153 defines a stress concentration that increases the likelihood of yielding or fracturing at or near the stress concentration. The aperture 153 also reduces the area of, or material that forms, the of the guard plate 134. In general, the aperture 153 weakens the guard plate 134 so that the guard plate 134 tends to yield before the assembly 100 becomes significantly entangled and before other components fail. While the illustrated embodiment incorporates the aperture 153 as the yield feature, it will be appreciated that the yield feature can take other forms (e.g., additional apertures, recesses along the radial edge(s) of the guard plate, grooves in the guard plate 134, a thinner section of the guard plate 134, etc.). The yield section 155 generally fails along the line L when the force associated with accumulation of material on the guard plate 134 exceeds a failure threshold of the guard plate 134 to prevent damage to other components of the assembly 100. In the event of a failed guard plate 134, a user may replace the guard plate by removing the fasteners 138 and attaching a replacement guard plate to the housing 106.

As shown in FIG. 4, the guard plate 134 need not be aligned with the shaft axis 118. In the illustrated embodiment, the guard plate 134 extends along a plane that does not intersect the shaft axis 118. In some embodiments, the guard plate 134 can be positioned in a plane that extends through the shaft axis 118.

As shown in FIGS. 2 and 3, the cutter assembly 100 includes two guard plates 134 that are disposed on opposite sides of the bearing housing 110 (e.g., symmetrical or non-symmetrical relative to the shaft axis 118). The illustrated guard plates 134 extend through the same plane on opposite sides of the shaft 114, although the guard plates 134 can be disposed in different planes. Also, the two guard plates 134 are illustrated as being identical, but the guard plates 134 can have different sizes and/or shapes relative to each other.

FIGS. 5-9 illustrate another cutter assembly 200 that can be mounted on the distal end 22 of an arm assembly 16a for incorporation into the material reduction machine 10, or used on another machine (not illustrated). Except as described below, the features of the cutter assembly 200 are the same as the features of the cutter assembly 100 described with regard to FIGS. 2-4, and the features of the cutter assembly 200 are identified by the same reference numerals increased by 100. As illustrated, the cutter assembly 200 includes a comminution wheel 202, bearing assemblies 206, and a shaft 208 that is rotatably supported at both ends of the shaft 208 by the bearing assemblies 206. A plurality of cutters or teeth 207 are attached to the comminution wheel 202.

The bearing assemblies 206 are aligned with each other such that the shaft 208 is coupled to the shaft support of each of the bearing assemblies 206. This shaft support (not shown) can include an inner race of a bearing disposed within the bearing housing 210 of the bearing assembly 206. Each bearing assembly 206 includes a bearing housing 210 that is coupled to the arm assembly 16a adjacent the distal end 22 by one or more fasteners 212 (best seen in FIG. 5). The bearing assemblies 206 may each include a bearing support (which can include an outer race of a bearing disposed within the bearing housing 210 of the bearing assembly), bearings coupled to the bearing support, and a shaft support coupled to the bearings. The shaft 208 rotates about a shaft axis 218, which in turn rotates the comminution wheel 202. The comminution wheel 202 extends outward from the shaft 208 in a radial wheel direction 220 that is perpendicular to the shaft axis 218.

The cutter assembly 200 further includes a drive system 215 that is connected to the shaft 208 and that uses power from the primary driver 14 to drive the comminution wheel 202. As illustrated, the drive system 215 includes a drive belt 217 that is drivingly engaged with a pulley 219 through which the shaft extends. It will be understood that the shaft 208 may be driven in other ways.

Figure 5:
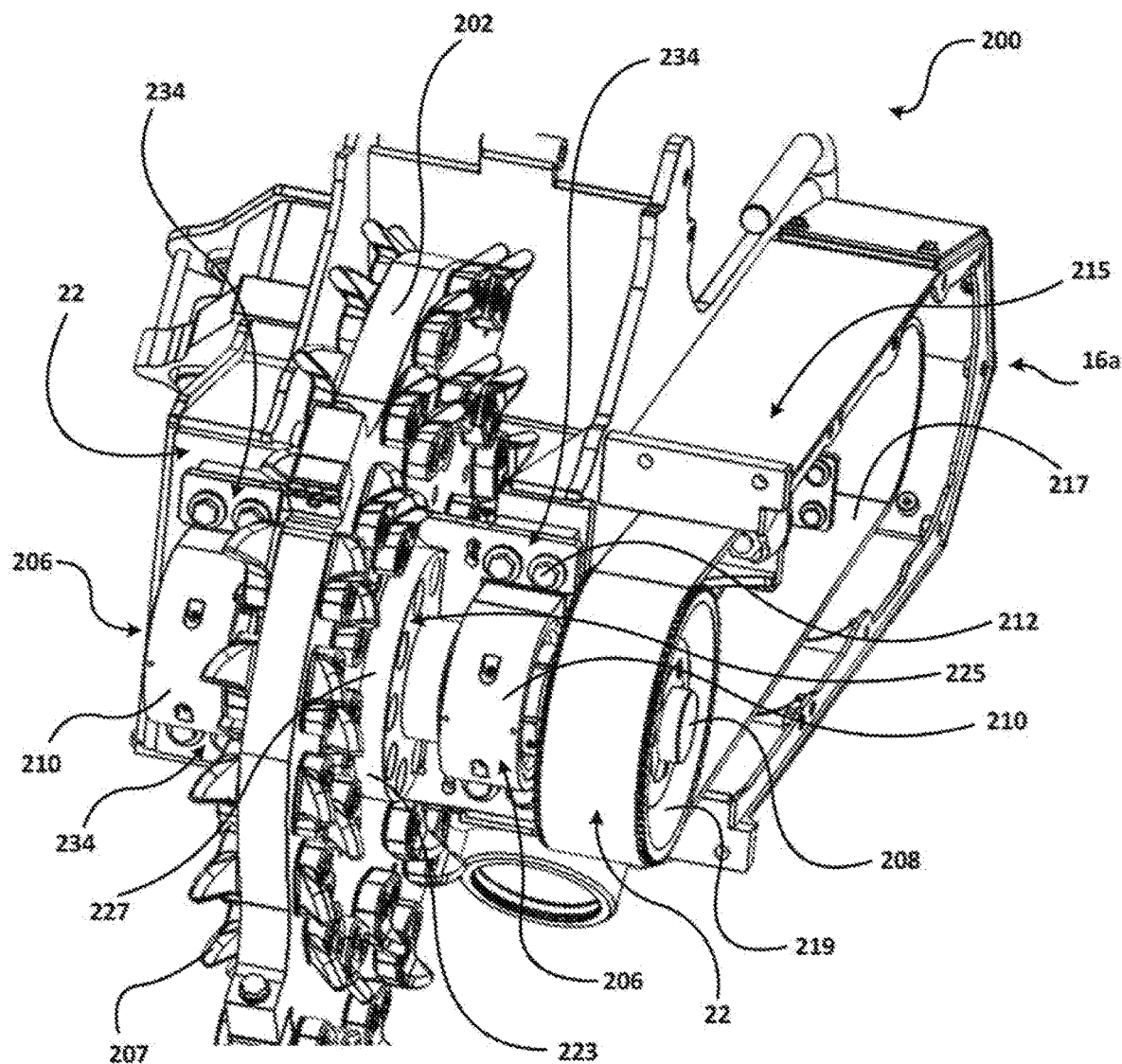
FIG. 5 is a perspective view of another cutter assembly embodying the present invention and including teeth mounted on a comminution wheel that is rotated by a shaft.
Figure 6:
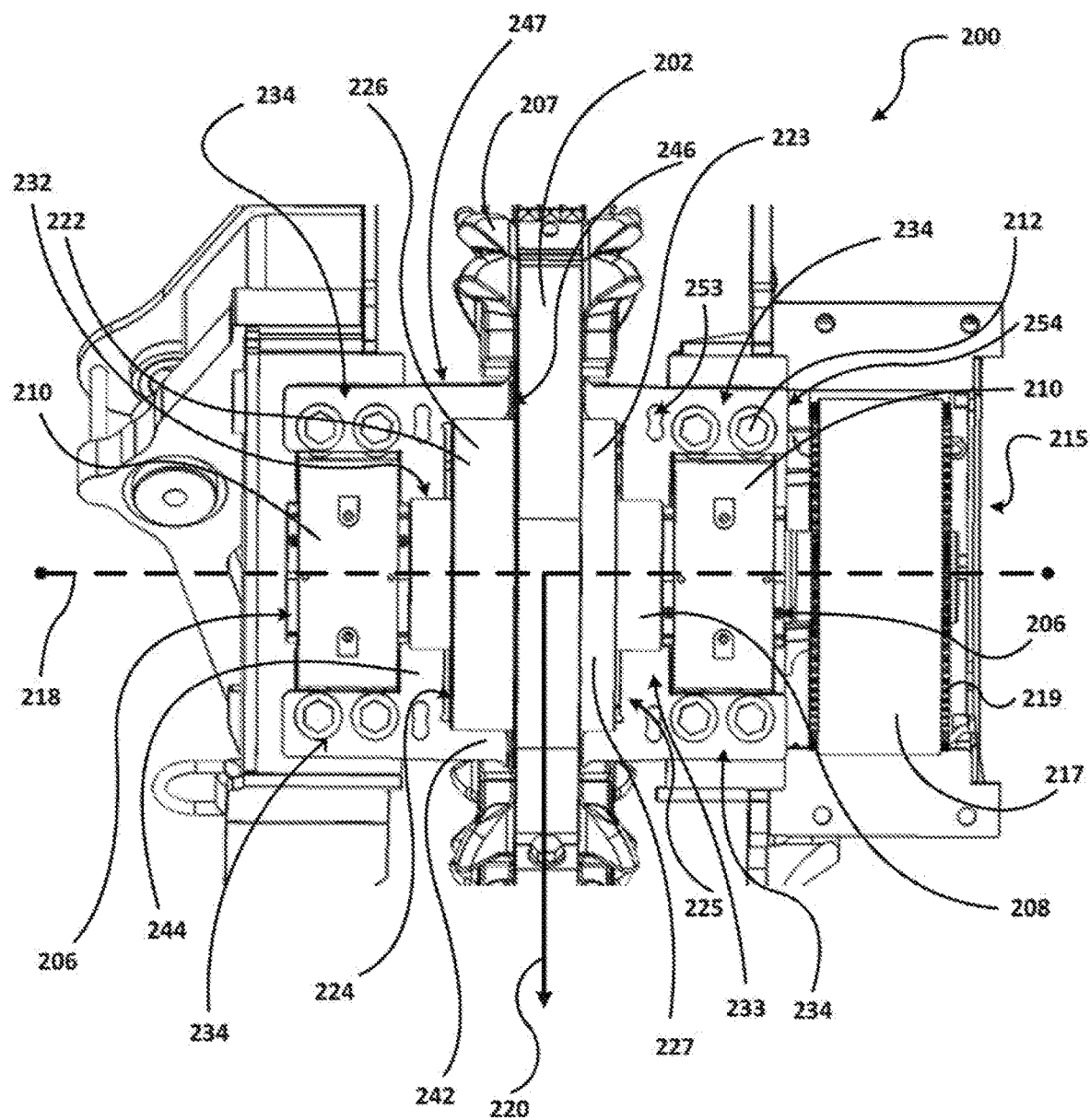
FIG. 6 is an elevation view of the stump cutter assembly of FIG. 5 with some of the teeth removed from the comminution wheel for clarity, and including a shaft, bearing assemblies, and guard plates.
Figure 7:
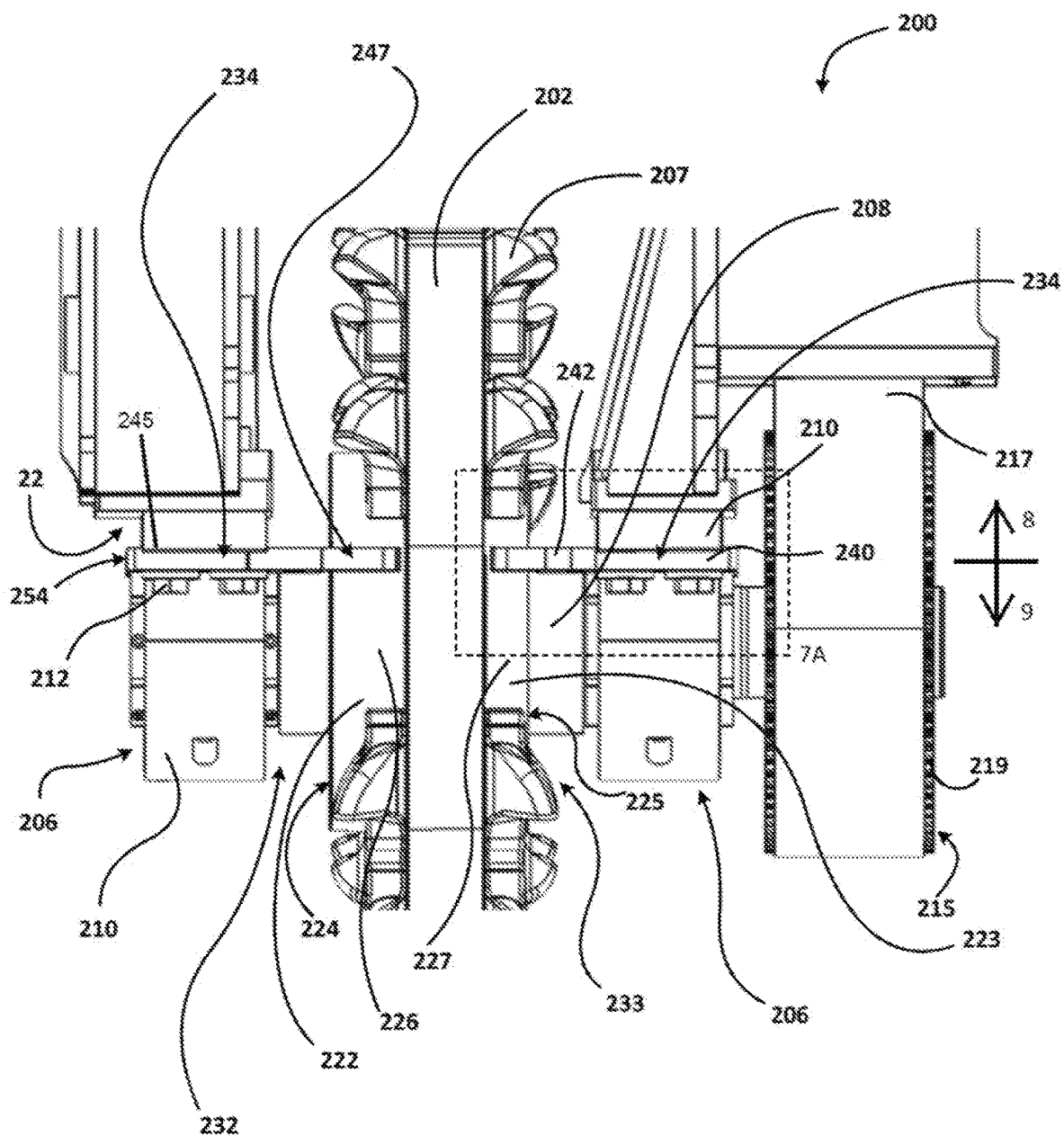
FIG. 7 is a plan view of a portion of the stump cutter assembly of FIG. 5 with some of the teeth removed from the comminution wheel for clarity.

With reference to FIG. 6, the cutter assembly 200 includes a hub 222 that is connected to the shaft 208 and that rotates with the shaft 20. The hub 222 is of one piece with or is otherwise fixed to the shaft 208 to transfer rotation from the shaft 208 to the comminution wheel 202. A clamp ring 223 attaches the hub 222 to the comminution wheel 202 to spread the clamping force of hub fasteners to the wheel 202. The hub 222 includes a first exterior surface 224, and the clamp ring 223 includes a second exterior surface 225 each facing away from the comminution wheel 202. Referring to FIGS. 5 and 7, a first radial pocket or gap 232 is defined between the respective bearing assembly 206 (e.g., an exterior of the bearing housing 210), a portion of the shaft 208, and the first exterior face 224. As shown in FIG. 7, a second radial pocket or gap 233 is defined between the respective bearing assembly 206, a portion of the shaft 208, and the second exterior face 225. The hub 222 and the clamp ring 223 also include respective first and second circumferential surfaces 226, 227.

With reference to FIGS. 5-9, four guard plates 234 are attached to the bearing housings 210 and to the arm assembly 16a via fasteners 212. Each guard plate 234 includes mounting holes 236 that receive the respective fasteners 212. The comminution wheel 202 and the shaft 208 rotate relative to the guard plate. Each guard plate 234 also includes a mounting portion 240, a first guard portion, 242, and a second guard portion 244. While FIGS. 5-9 illustrate four guard plates 234, fewer than four or more than four guard plates 234 may be incorporated into the cutter assembly 200.

Figure 7A:
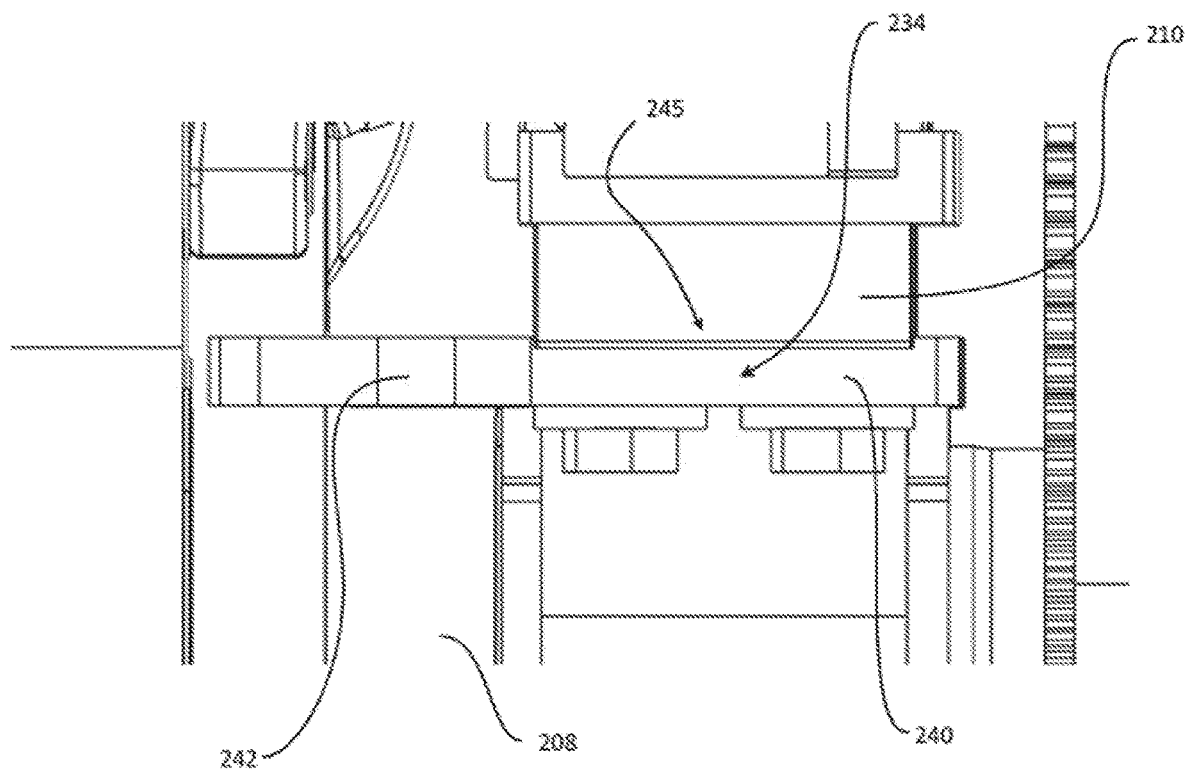
FIG. 7A is a detailed plan view of a portion of the stump cutter assembly within the dashed line box of FIG. 7.

As shown in FIG. 7A, the illustrated mounting portion 240 of guard plates 234 includes a saddle feature 245 (e.g., a recessed area or pocket) that mates or conforms to (e.g., fits onto) the face of the bearing housing 210. The saddle feature 245 provides a guide to mount the guard plate 234 onto the bearing housing 210 and assists with resisting movement (e.g., slippage and/or turning) of the guard plate 234 after the guard plate 234 is secured to the bearing housing 210. The saddle feature 245 also prevents the fasteners 212 from taking too much load and reduces the chances of fastener failure or loosening of the fasteners prior to the guard plate 234 yielding or fracturing when the cutter assembly 200 encounters wrapped material or an impact with an obstruction. As such, this bearing fastener joint formed by the saddle feature 245, the fasteners 212, and the bearing housing 210 maintains its full clamp load even during yielding or fracturing of the guard plate 234. This full clamp load maintenance is accomplished by cooperation of the saddle feature 245 with the yield feature (e.g., the aperture 253). It will be appreciated that while the illustrated saddle feature 245 is part of the guard plate 234 and mates with a conforming face on the bearing housing 210, the saddle feature may instead be part of the bearing housing 210 for mating with the guard plate 234.

A portion of the first radial inner edge 248 of the first guard portion 242 is disposed adjacent the first circumferential surface 226 of the hub 222. The first guard portion 242 edge rises away from the circumferential surface 226 of the hub 222 to include a curved edge where the first radial inner edge 248 meets the first axial edge 246 of the guard plate 234. The first guard portion 242 of the guard plate 234 also includes a rising ridge adjacent the clamp ring 223.

A radial outer edge 247 of the first guard portion 242 rises radially outward (e.g., as a straight inclined edge, a convex curved edge, a concave curved edge, etc.) adjacent the comminution wheel 202. In some embodiments, the rise may extend along a larger portion of the outer edge 247 (e.g., less than half of the axial length of the guard plate 234 or more than half of the axial length of the guard plate), or along the entire length of the guard plate.

Figure 8:
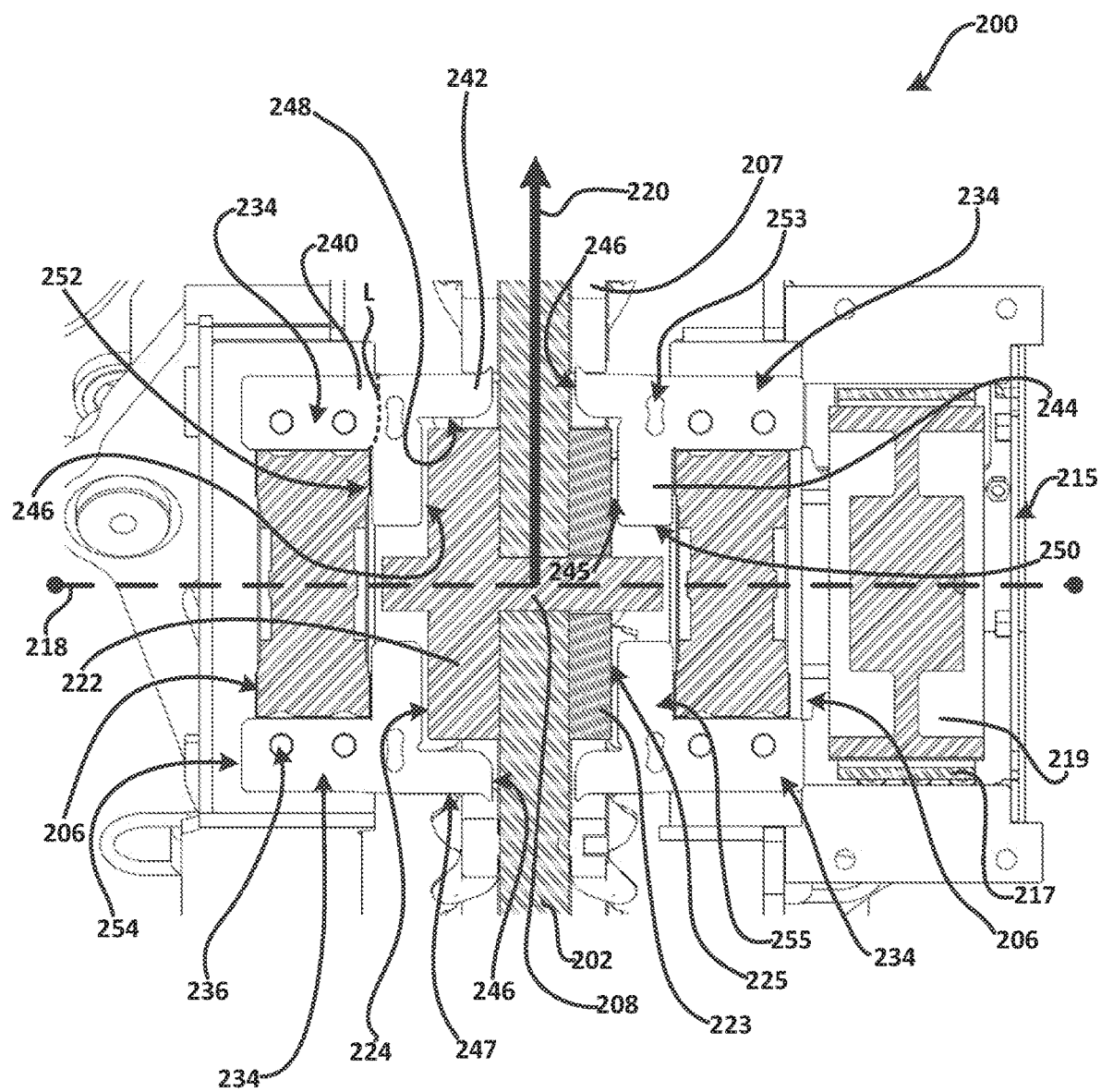
FIG. 8 is a cross-section view of the stump cutter assembly taken along line 8-8 of FIG. 7 and illustrating a portion of the stump cutter assembly including the comminution wheel, the shaft, the bearing assemblies, and the guard plates.
Figure 9:
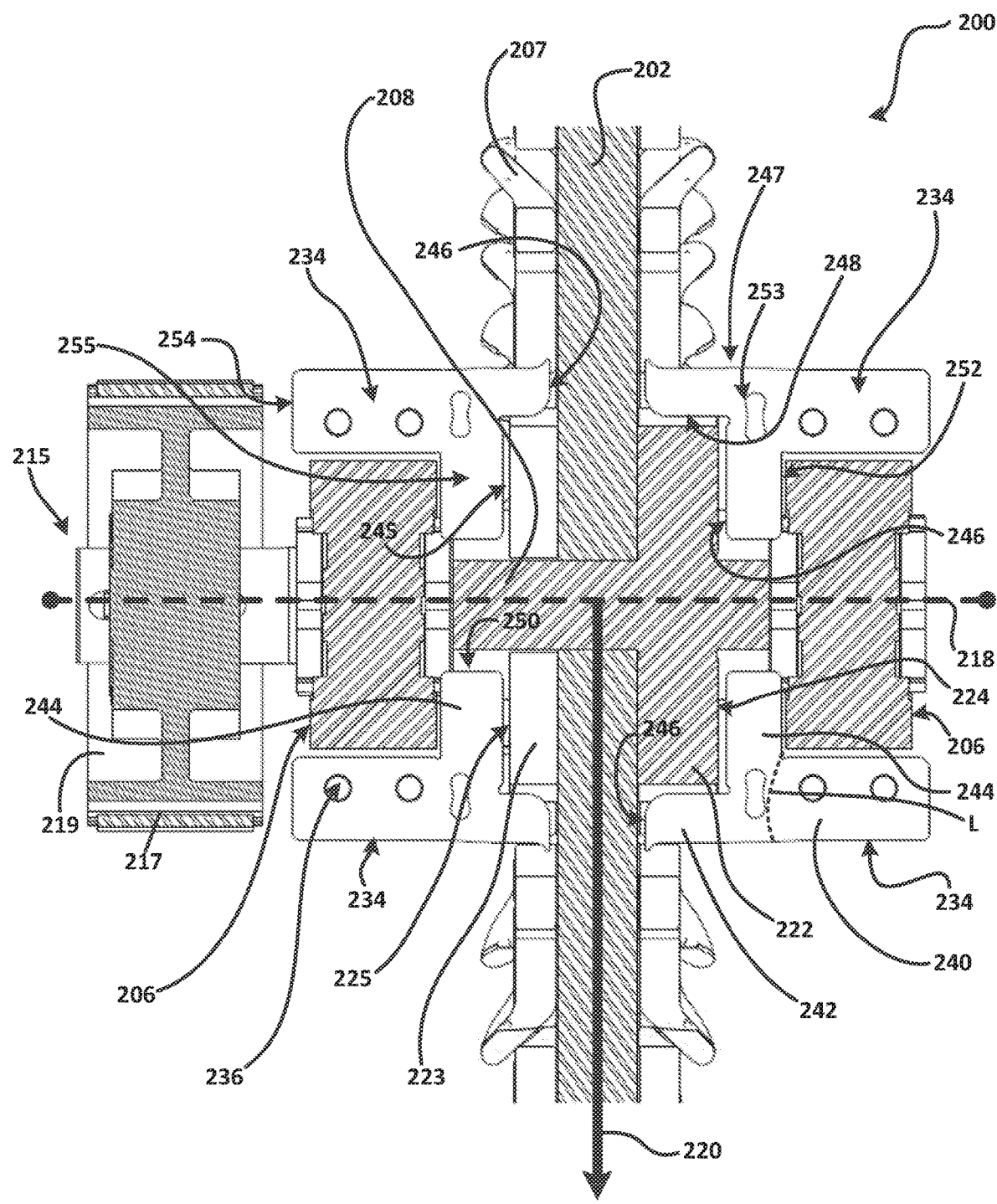
FIG. 9 is a cross-section view of the stump cutter assembly taken along line 9-9 of FIG. 7 illustrating a portion of the stump cutter assembly including the comminution wheel, the shaft, the bearing assemblies, and the guard plates.

With reference to FIGS. 8 and 9, the illustrated second gap 233 is wider than the first gap 232. As such, the guard plates 234 occupying the second gap 233 are shown having wider second guard portion 244 than the guard plates 234 occupying the first gap 232. It should be understood that the size and/or shape of each guard plate 234 may vary to fill the gaps 232, 233 with minimal clearance relative to other parts (the comminution wheel 202, the hub 222, the clamp ring 223, etc.) such that each guard plate occupies a majority, or even substantially all, of the respective gaps. That is, each guard plate 234 occupies or takes up the space defining the gap to the maximum extent possible, leaving minimal clearance relative to the other parts. Each side of the comminution wheel 202 may include only one guard plate 234, two guard plates as illustrated, or more guard plates.

With reference to FIGS. 6, 8, and 9, each of the guard plates 234 also includes an aperture 253 (e.g., an elongated aperture such as an oval, two overlapping cylindrical apertures, a peanut-shaped aperture as shown in FIG. 8) that is positioned generally closer to the first axial edge 246 than the third axial edge 254 of each guard plate 234. The aperture 253 facilitates bending away or breaking away of a portion of the guard plate 234 when a significant amount of material wraps around the guard plate 234 or otherwise impacts the guard plate 234 in a similar manner to that described above with regard to the aperture 153 of the stump cutter assembly 100 shown in FIGS. 2-4. That is, the aperture 253 defines a stress concentration that increases the likelihood of yielding or fracturing in the area of the aperture 253, and also reduces the material that is used to form the guard plate 234.

Figure 10:
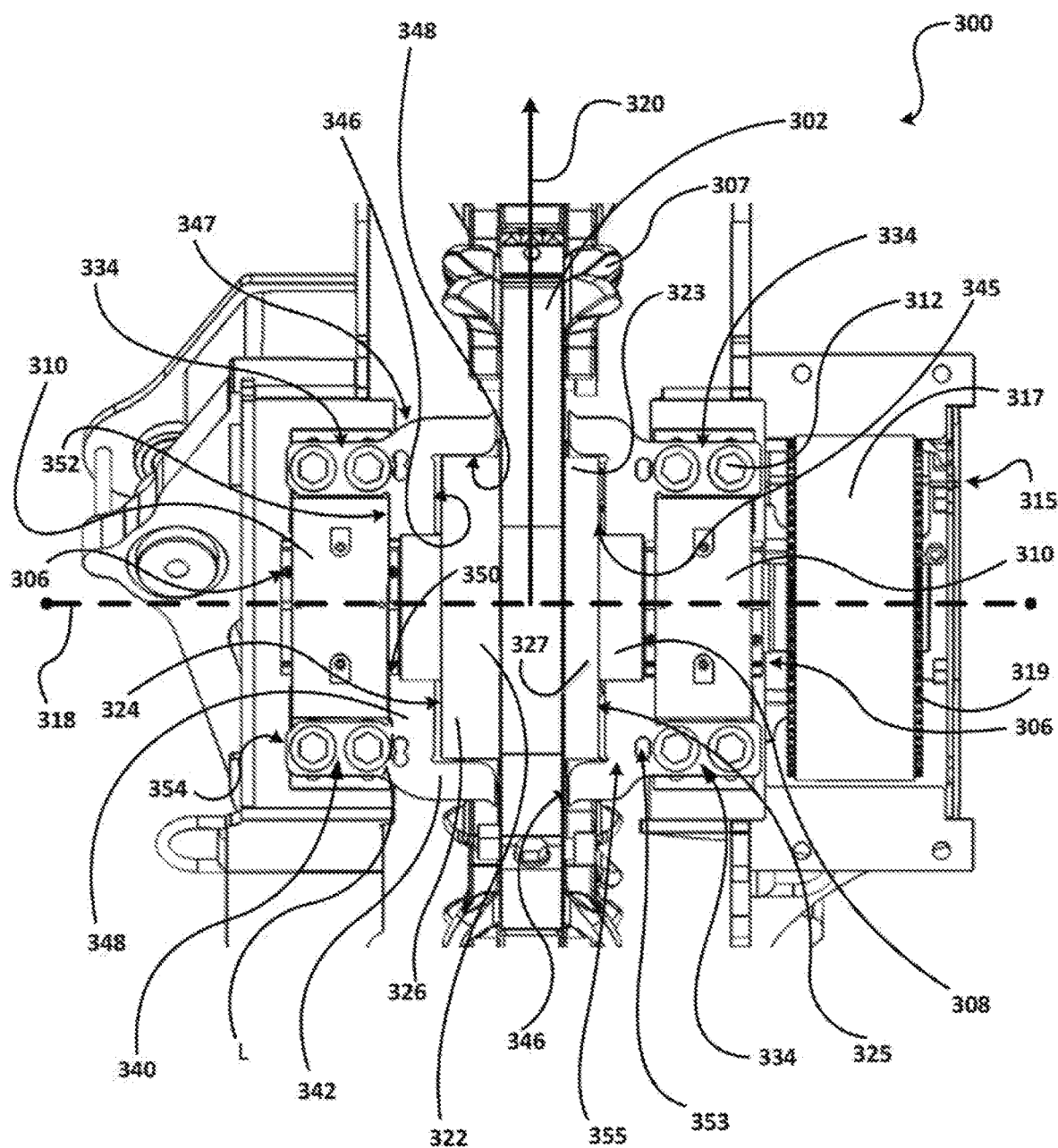
FIG. 10 is an elevation view of the stump cutter assembly of FIG. 5 with some of the teeth removed from the comminution wheel for clarity, and including the shaft, the bearing assemblies, and other guard plates embodying aspects of the present invention.
Figure 11:
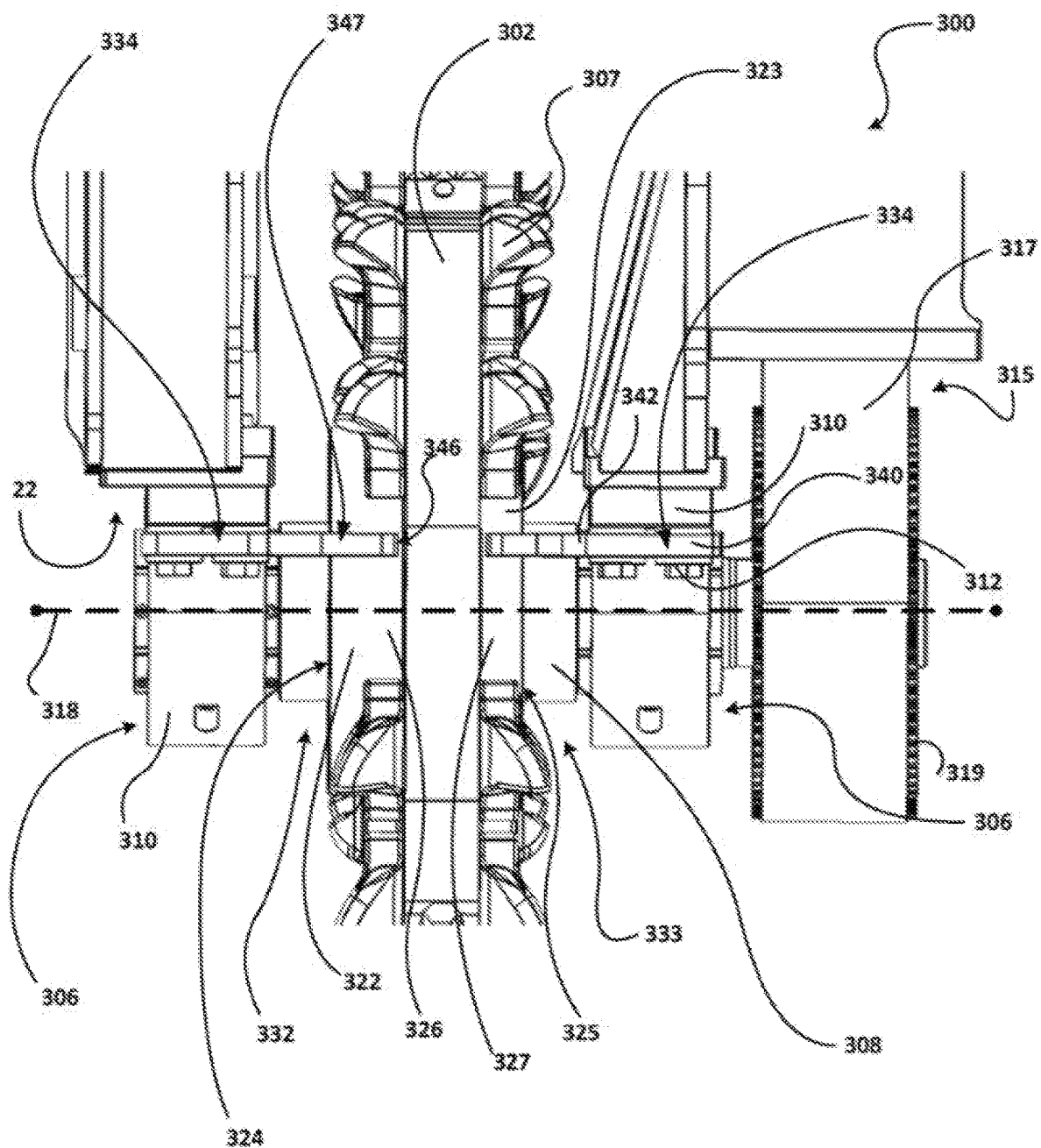
FIG. 11 is a plan view of the stump cutter assembly of FIG. 5 with some of the teeth removed and with the alternate embodiment of the guard plates connected thereto.

FIGS. 10 and 11 illustrate another cutter assembly 300 that can be mounted on the distal end 22 of the arm assembly 16 for incorporation into the material reduction machine 10, or used on another machine (not illustrated). Except as described below, the features of the cutter assembly 300 are the same as the features of the cutter assembly 200 described with regard to FIGS. 5-9, and the features of the cutter assembly 300 are identified by the same reference numerals increased by 100.

Referring to FIG. 10, the radial outer edge 347 of the first guard portion 342 curves radially outward from adjacent the mounting portion 340 toward the wheel 302. The radial outer edge 347 also has a portion that is substantially parallel or parallel to the axis 318 between the radial curvature and the wheel 302. The radial outer edge 347 terminates adjacent the wheel 302 with a radial rise that is the same or similar to the rise described with regard to FIGS. 2-4. The shape of the outer edge 347 can aid in catching and redirecting the material away from the wheel 302.

As illustrated in FIG. 11, the relationship between the mounting portion 340 of the guard plate 334 is flat or abutting in the sense that neither the mounting portion 340 nor the bearing housing 310 has a saddle feature. Referring back to FIG. 10, the second axial edge 352 of the second guard portion 344 of each guard plate 334 is disposed very close to the bearing housing 310 (e.g., in an abutting relationship) to prevent slippage or turning of the guard plate 334.

In general, the guard plates 134, 234, 334 can be used on any material reduction machine that has a tendency for material to become wrapped around the shaft or bearing assembly to minimize wrapping of the material and downtime of the machine. The radial and axial extents of the guard plates 134, 234, 334 fill the radial gap that exists between the comminution wheel, the shaft, and the bearing assembly to minimize or prevent damage to the cutter assembly. The yield feature (e.g., the aperture 153, 253, 353) assists with minimizing damage to other parts of the cutter assembly when a significant amount of material does impact the guard plate 134, 234, 334 (e.g., overload situations where an immovable object binds the guard plate 134, 234, 334). Stated another way, the apertures 153, 253, 353 allow the guard plate 134, 234, 334 to yield before the bolts securing the wheel and/or bearings fail. In addition to the drastically reduced time to remove any wrapped material from the comminution wheel, the anti-wrap guard plates 134, 234, 334 also reduce the chances of severe heat buildup that commonly occurs when the wheel continues to spin with tightly bound material.

Various features and advantages of the disclosure are also set forth in the following claims.

What is claimed is:

1. A material reduction machine comprising:
a frame;
a primary driver supported by the frame;
an arm assembly coupled to and extending from the frame, the arm assembly having a proximal end attached to the frame and a distal end opposite the proximal end;
a bearing assembly including a bearing housing coupled to the arm assembly adjacent the distal end;
a shaft rotatably coupled to the bearing assembly and having a shaft axis about which the shaft is configured to rotate; and
a comminution wheel coupled to the shaft for rotation with the shaft about the shaft axis, the comminution wheel configured to be driven by a drive system and extending outward from the shaft in a radial direction that is perpendicular to the shaft axis;
wherein a gap is defined between a portion of the shaft, the bearing assembly, and the comminution wheel;
a guard plate attached to the bearing assembly or the arm assembly such that the guard plate does not rotate with the comminution wheel, the guard plate having an axial extent extending along the shaft axis and a radial extent extending radially relative to the shaft axis to fill a majority of the gap, wherein the axial extent and the radial extent lie in a plane.

2. The material reduction machine of claim 1, wherein the comminution wheel includes a plurality of teeth arranged on the wheel.

3. The material reduction machine of claim 1, further comprising a hub connected to the shaft, the hub including
an axial inner surface in contact with the comminution wheel;
an axial outer surface opposite the axial inner surface; and
a radial outer surface.

4. The material reduction machine of claim 1, wherein the guard plate includes a mounting portion attached to the bearing assembly or the arm assembly, a first guard portion extending from the mounting portion in a direction along the shaft axis and defining the axial extent, and a second guard portion extending radially and defining the radial extent.

5. The material reduction machine of claim 4, wherein the first guard portion terminates adjacent the comminution wheel and the second guard portion terminates adjacent the shaft and the bearing assembly.

6. The material reduction machine of claim 1, wherein the guard plate has a radial outer edge that is at least partially non-linear in the axial direction.

7. The material reduction machine of claim 1, wherein the guard plate has a radial outer edge with at least a portion that is parallel to the shaft axis.

8. The material reduction machine of claim 1, wherein the comminution wheel and the shaft rotate relative to the guard plate.

9. The material reduction machine of claim 1, wherein the guard plate includes a yield feature configured to yield when a load due to material becoming entangled exceeds a predetermined threshold.

10. The material reduction machine of claim 9, wherein the guard plate yields before other components of the material reduction machine fail due to material becoming entangled.

11. The material reduction machine of claim 9, wherein the guard plate is attached to the bearing assembly or the arm assembly at a mounting location, and wherein the guard plate yields at a location other than at the mounting location.

12. The material reduction machine of claim 1, wherein the guard plate includes a saddle feature to attach the guard plate to the bearing assembly or the arm assembly.

13. A cutter assembly configured for use with a material reduction machine, the cutter comprising:
a bearing assembly including a bearing housing configured to be operatively coupled to the material reduction machine;
a shaft rotatably coupled to the bearing assembly and having a shaft axis about which the shaft is configured to rotate; and
a comminution wheel coupled to the shaft for rotation with the shaft about the shaft axis, the comminution wheel configured to be driven by a drive system and extending outward from the shaft in a radial direction that is perpendicular to the shaft axis;
wherein a gap is defined between a portion of the shaft, the bearing assembly, and the comminution wheel;
a guard plate attached to the bearing assembly or an arm assembly such that the guard plate does not rotate with the comminution wheel, the guard plate having an axial extent extending along the shaft axis and a radial extent extending radially relative to the shaft axis to fill a majority of the gap.

14. The cutter assembly of claim 13, wherein the comminution wheel includes a plurality of teeth arranged on the wheel.

15. The cutter assembly of claim 13, further comprising a hub connected to the shaft, the hub including
an axial inner surface in contact with the comminution wheel;
an axial outer surface opposite the axial inner surface; and
a radial outer surface.

16. The cutter assembly of claim 13, wherein the guard plate includes a mounting portion attached to the bearing assembly or the arm assembly, a first guard portion extending from the mounting portion in a direction along the shaft axis and defining the axial extent, and a second guard portion extending radially and defining the radial extent.

17. The cutter assembly of claim 16, wherein the first guard portion terminates adjacent the comminution wheel and the second guard portion terminates adjacent the shaft and the bearing assembly.

18. The cutter assembly of claim 13, wherein the guard plate has a radial outer edge that is at least partially non-linear in the axial direction.

19. The cutter assembly of claim 13, wherein the guard plate has a radial outer edge that is parallel to the shaft axis.

20. The cutter assembly of claim 13, wherein the comminution wheel and the shaft rotate relative to the guard plate.

21. The cutter assembly of claim 13, wherein the guard plate includes a yield feature configured to fail before other components fail due to material becoming entangled.

22. The cutter assembly of claim 21, wherein the guard plate includes a saddle feature configured to mate the guard plate with the bearing assembly or the arm assembly.

23. The cutter assembly of claim 22, wherein the guard plate is attached to the bearing assembly, wherein bearing mount fasteners that define a bearing fastener joint attach the guard plate to the bearing assembly, and wherein the yield feature and the saddle feature cooperate to maintain the integrity of the bearing fastener joint during yield or failure of the guard plate.

24. The cutter assembly of claim 13, wherein the guard plate occupies substantially all of the gap such that minimal clearance exists between the guard plate and adjacent parts of the cutter assembly.

* * * * *